(12) United States Patent
Daws et al.

(10) Patent No.: US 6,640,943 B1
(45) Date of Patent: Nov. 4, 2003

(54) SHOCK ABSORBER WITH SEALING ICE SCRAPER

(75) Inventors: Michael J. Daws, Aptos, CA (US); Dustin F. Janes, Jr., Watsonville, CA (US)

(73) Assignee: Fox Factory, Inc., Watsonville, CA (US)

( * ) Notice: Subject to any disclaimer, the term of this patent is extended or adjusted under 35 U.S.C. 154(b) by 0 days.

(21) Appl. No.: 10/217,675

(22) Filed: Aug. 13, 2002

(51) Int. Cl.[7] .................................................. F16F 9/36
(52) U.S. Cl. .................... 188/322.17; 277/564; 277/568
(58) Field of Search ................................. 277/568, 564, 277/550, 585, 910; 188/322.17

(56) References Cited

U.S. PATENT DOCUMENTS

| | | | |
|---|---|---|---|
| 3,549,154 A | * 12/1970 | Jones | 277/550 |
| 4,013,299 A | * 3/1977 | Scott | 277/556 |
| 4,494,632 A | 1/1985 | de Baan et al. | |
| 4,987,826 A | 1/1991 | Deppert et al. | |
| 5,098,071 A | 3/1992 | Umetsu | |
| 5,118,206 A | * 6/1992 | Otto et al. | 384/477 |
| 5,178,243 A | 1/1993 | Hamada et al. | |
| 5,441,132 A | 8/1995 | Pradel et al. | |
| 5,584,368 A | 12/1996 | Larsson | |
| 5,653,449 A | * 8/1997 | Martin | 277/500 |
| 5,897,119 A | * 4/1999 | McMillen | 277/562 |
| 6,267,383 B1 | * 7/2001 | Morvant | 277/439 |
| 6,390,258 B1 | * 5/2002 | Hofmann et al. | 188/322.17 |

* cited by examiner

Primary Examiner—Matthew C. Graham
Assistant Examiner—Benjamin A. Pezzlo
(74) Attorney, Agent, or Firm—James F. Hann; Haynes Beffel & Wolfeld LLP

(57) ABSTRACT

A shock absorber (2) includes a piston assembly (6) and a damping fluid cylinder (4) having a first end (22) and defining a damping fluid chamber (56). The piston assembly includes a piston (14) mounted to a shaft (8). The piston divides the damping fluid chamber into first and second variable-volume parts (58, 60). At least one restricted flow path is provided between the variable-volume parts of the cylinder, preferably one (18) for compression and one (19) for rebound or extension. A sealing ice scraper assembly (30) is mounted to the first end of the cylinder. The scraper assembly includes a sealing ice scraper sleeve (34) having a generally cylindrical scraper surface (36). A gap of a desired size, typically quite small, is provided between the scraper surface and the shaft. A recess (38) is formed into the scraper surface and houses an outer fluid seal (40) therein. Therefore, ice (66) and any liquid within the gap, which may have been produced in part by the interaction of the scraper sleeve, shaft and ice, are at least inhibited, if not prevented, from passing the outer fluid seal and into the damping fluid chamber.

19 Claims, 2 Drawing Sheets

SHOCK ABSORBER WITH SEALING ICE SCRAPER

BACKGROUND OF THE INVENTION

Shock absorbers typically comprise a damping fluid cylinder and a piston assembly. The piston assembly typically includes a shaft having an inner end mounted to a vented piston housed within the cylinder. Vehicle shock absorbers are commonly constructed so that the outer end of the shaft, which extends through one end of the cylinder, is mounted to one portion of the vehicle and the cylinder is mounted to another portion of the vehicle The one end of the cylinder has a seal, which provides a sliding sealing contact with the shaft passing through the one end of the cylinder.

One problem associated with outdoor vehicles such as snowmobiles is that ice may accumulate on the piston shaft. This is a problem because the ice on the piston shaft may be forced past the resilient seals surrounding the piston shaft and contaminate the damping fluid within the shock absorber. Such contamination may result in corrosion of the internal parts of the shock absorber, which may result in its early failure, and in a change in the flow characteristics of the damping fluid to change the operational characteristics of the shock absorber. Accumulated ice may also damage or destroy the sealing effectiveness of the seals surrounding the piston shaft, thus further damaging the shock absorber. See U.S. Pat. No. 5,584,368.

SUMMARY OF THE INVENTION

The present invention is directed to a shock absorber including a sealing ice scraper assembly designed to remove ice from the piston shaft and to prevent ice and liquids, in particular water on the outside of the piston shaft, from entering into the interior of the cylinder.

A shock absorber made according to the invention includes broadly a piston assembly and a damping fluid cylinder having a first end and defining a damping fluid chamber therein. The piston assembly includes a shaft having a first shaft end within the cylinder and a piston mounted to the shaft towards the first shaft end. The piston is movable within the cylinder and divides the damping fluid chamber into first and second variable-volume parts. A restricted flow path is provided between the variable-volume parts of the cylinder. A sealing scraper assembly is mounted to the first end of the cylinder. The scraper assembly includes a sealing ice scraper member, used to remove ice from the shaft, having a generally cylindrical scraper surface. A gap of a desired size, typically quite small, is provided between the scraper surface and the shaft. A recess is formed into the scraper surface and houses an outer fluid seal between the scraper surface and the shaft. Therefore, any liquid within the gap is at least inhibited, if not prevented, from passing the outer fluid seal and into the damping fluid chamber.

The scraper assembly is preferably mounted to an interface housing mounted to the first end of the cylinder. The scraper member is preferably radially positioned by a resilient centering element captured between the scraper member and the interface housing. The scraper member may also be mounted to be free to shift axially. An inner fluid seal may be used to both seal the shaft and provide an axially-directed biasing force against the scraper member.

Other features and advantages of various aspects of the invention will appear from the following description in which the preferred embodiment has been set forth in detail in conjunction with the accompanying drawings.

DESCRIPTION OF THE PREFERRED EMBODIMENT

Figure 1:
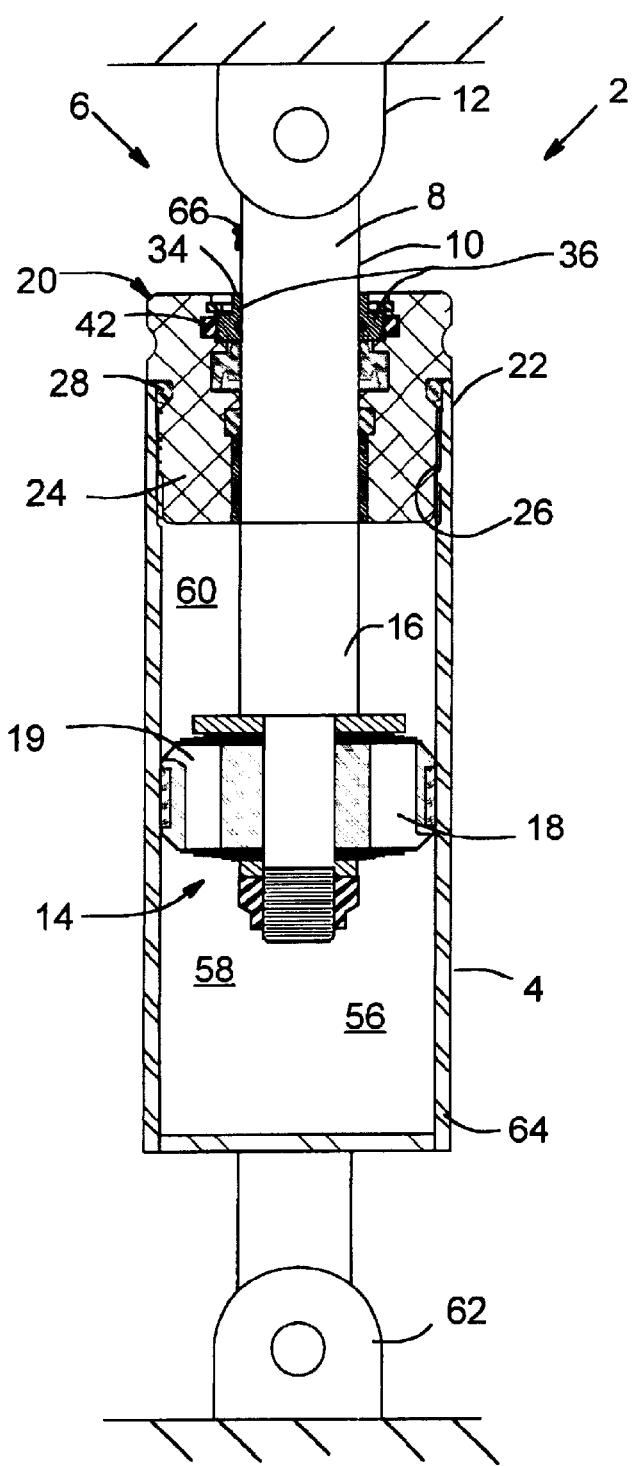
FIG. 1 is a simplified cross-sectional view of a shock absorber made according to the present invention.

FIG. 1 is a cross-sectional view of a shock absorber 2 made according to the invention including a damping fluid cylinder 4 and a piston assembly 6. Piston assembly 6 includes an elongated shaft 8 having an outer end 10 connected to a first mounting element 12 and a vented piston 14 at its inner end 16. Vented piston 14 has a number of restricted-flow fluid paths 18, 19 formed therethrough to permit fluid flow past the piston as is conventional. Other restricted-fluid flow paths could be provided, such as through shaft 8 or through cylinder 4 or a combination thereof.

Figure 2:
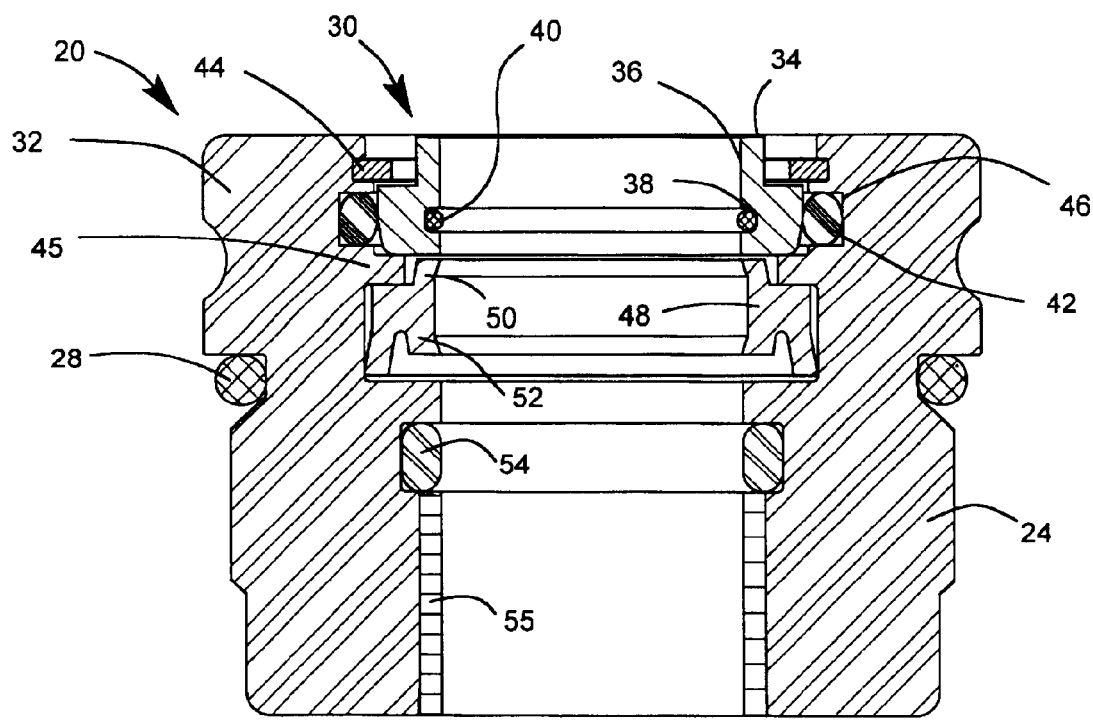
FIG. 2 is an enlarged cross-sectional view of the interface housing and a scraper assembly of FIG. 1.

A hollow, generally cylindrical interface housing 20, shown best in FIG. 2, is mounted to the outer end 22 of cylinder 4 and includes a body 24 which sealably engages the inner surface 26 of cylinder 4 with an O-ring 28. A sealing scraper assembly 30 is mounted to the outer end 32 of body 24. The scraper assembly 30 includes a sealing ice scraper member in the form of a generally cylindrical, sealing ice scraper sleeve 34 which defines a cylindrical scraper surface 36 therein. Scraper sleeve 34 is used to remove ice 66 on shaft 8 from the shaft to prevent the ice from entering damping fluid chamber 56. A recess 38 is formed within surface 36 and houses an outer fluid seal 40.

Scraper assembly 30 is positioned within body 24 by a number of components. These components permit the scraper assembly 30 to float or move somewhat in both the radial and axial directions. Radial movement and centering is achieved through the use of a resilient centering element in the form of an O-ring 42 captured between body 24 and scraper sleeve 34. Axial movement in the vertical direction in FIGS. 1 and 2 is limited by a snap ring 44, housed within a recess 46 formed in body 24, and by a ledge 45 of body 24. Scraper sleeve 34 is normally biased in the vertical direction against snap ring 44 by a resilient, axial position mounting element 48.

Mounting element 48 is a dual purpose mounting element and includes a conical sealing portion 50 which biases scraper sleeve 34 against snap ring 44; portion 50 of element 48 also acts as a seal and is in sealing contact with the outer surface of shaft 8. Element 48 further includes a supplemental sealing portion 52 which engages the outer surface of shaft 8. Interface housing 20 further includes an additional O-ring seal 54 and a sleeve 55 which engage the outer surface of shaft 8. Interface housing 20 and cylinder 4 define a damping fluid chamber 56 within the interior of cylinder 4. Piston 14 separates damping fluid chamber 56 into first and second variable-volume parts 58 and 60.

A primary advantage of the invention is that by the provisions of outer fluid seal 40 within recess 38 formed within cylindrical scraper surface 36, any ice 66 on shaft 8 which is momentarily liquefied by the interaction of scraper sleeve 34, ice 66 and shaft 8, is at least inhibited, and is preferably effectively prevented, from entering the interior of cylinder 4. Of course any water or other liquid which may be on the surface of shaft 8 will also be at least inhibited from passing outer fluid seal 40 and into damping fluid chamber 56.

Shock absorber 2 is typically used on outdoor equipment such as, for example, snowmobiles, all terrain vehicles, motorcycles and bicycles. First mounting element 12 at end 10 of shaft 8 is mounted to one portion of the vehicle while a second mounting element 62 is used to secure the lower (in FIG. 1) end 64 of cylinder 4 to another portion of the vehicle. As the vehicle traverses the terrain, first and second mounting elements 12, 62 move towards and away from one another causing damping fluid within damping fluid chamber 56 to pass through restricted flow fluid paths 18, 19 as piston 14 moves through chamber 56. Ice 66 will be scraped away from shaft 8 by scraper sleeve 34; any water which may be created by the action of scraper sleeve 34 acting in conjunction with the shaft 8 against ice 66 will be at least inhibited, if not prevented, from passing into damping fluid chamber 56 by the outer fluid seal 40.

Body 24 of interface housing may be made of, for example, aluminum alloy or steel alloy or bronze. Scraper sleeve 34 is preferably made of a hard, tough material, such as bearing bronze or aluminum alloy, which exhibits an appropriate thermal coefficient of expansion vis-a-vis shaft 8. Typically, it will be desired that scraper sleeve 34 and shaft 8 have the same or similar coefficients of thermal expansion to ensure a proper gap between surface 36 and shaft 8 is maintained over a range of operating temperatures Modification and variation can be made to the disclosed embodiment without departing from the subject of the invention as defined in the following claims. For example, outer fluid seal 40 could be other than an O-ring and could include more than one sealing element.

Any and all patents, patent applications and printed publications referred to above are incorporated by reference.

What is claimed is:

1. A shock absorber comprising:
   a damping fluid cylinder having a first end defining a damping fluid chamber;
   a piston assembly comprising;
      a shaft having a first shaft end within the cylinder; and
      a piston mounted to the shaft towards the first shaft end for reciprocal movement within the cylinder, the piston dividing the chamber into first and second variable-volume parts;
   at least one of the piston assembly and the cylinder comprising a restricted fluid flow path fluidly coupling the first and second parts of the chamber; and
   a sealing scraper assembly, mounted at the first end of the cylinder, comprising:
      a sealing ice scraper member having a generally cylindrical scraper surface, said scraper surface defining a scraper surface bore through which said shaft reciprocally passes;
      said scraper surface bore being sized larger than said shaft so to define a desired gap between the scraper surface and the shaft;
      a recess formed into said scraper surface; and
      an outer fluid seal mounted within said recess and in fluid sealing contact with the shaft, whereby liquid within said gap is at least inhibited from passing the outer fluid seal and into said damping fluid chamber.

2. The shock absorber according to claim 1 wherein the piston defines said restricted flow path.

3. The shock absorber according to claim 1 wherein said scraper member and said shaft have substantially equal coefficients of thermal expansion over an operating temperature range.

4. The shock absorber according to claim 1 wherein said scraper surface has first and second ends, said recess being located closer to the second end than the first end.

5. The shock absorber according to claim 1 wherein said scraper member at positioned externally of the cylinder.

6. The shock absorber according to claim 1 further comprising an interface housing mounted to the first end of the cylinder, said scraper assembly being mounted to the cylinder by the interface housing.

7. The shock absorber according to claim 6 wherein the scraper assembly comprises a resilient centering element captured between the scraper member and the interface housing.

8. The shock absorber according to claim 6 further comprising at least one inner fluid seal carried by the interface housing and in sealing contact with the shaft between the outer fluid seal and the piston.

9. The shock absorber according to claim 6 wherein said interface housing comprises a first axial-position mounting element and a second, resilient, axial position mounting element, said scraper member captured between said mounting elements, whereby said scraper member may move axially against the second mounting element.

10. The shock absorber according to claim 9 wherein the second, resilient, axial-position mounting element acts as an inner fluid seal which is carried by the interface housing and is in sealing contact with the shaft.

11. The shock absorber according to claim 10 wherein said inner fluid seal comprises a generally conical sealing portion.

12. The shock absorber according to claim 11 wherein said generally conical sealing portion resiliently engages both said shaft and said scraper member.

13. The shock absorber according to claim 9 wherein said first mounting element is a substantially rigid mounting element.

14. The shock absorber according to claim 6 wherein said interface housing comprises axial movement limit surfaces which limit any axial movement of said scraper member.

15. The shock absorber according to claim 6 wherein said interface housing comprises means for permitting limited axial and radial movement of said scraper member relative to the cylinder.

16. The shock absorb or according to claim 1 wherein the scraper member comprises a sealing ice scraper sleeve.

17. A shock absorber of the type comprising a damping fluid cylinder and a piston assembly, the piston assembly comprising a piston housed within the cylinder and a shaft extending from the piston, through a shaft seal at a first end of the cylinder and out of the cylinder, the improvement comprising:
   a sealing scraper assembly, mounted at the first end of the cylinder, comprising:
      a sealing ice scraper member having a generally cylindrical scraper surface, said scraper surface defining a scraper surface bore through which said shaft reciprocally passes;
      said scraper surface bore being sized larger than said shaft so to define a desired gap between the scraper surface and the shaft;
      a recess formed into said scraper surface; and
      an outer fluid seal mounted within said recess and in fluid sealing contact with the shaft, whereby liquid within said gap is at least inhibited from passing the outer fluid seal and into said damping fluid chamber.

18. A shock absorber comprising:
   a damping fluid cylinder having a first end and defining a damping fluid chamber;
   a piston assembly comprising;
      a shaft having a first shaft end within the cylinder; and a piston mounted to the shaft towards the first shaft end for reciprocal movement within the cylinder, the piston dividing the chamber into first and second variable-volume parts;

at least one of the piston assembly and the cylinder comprising a restricted fluid flow path fluidly coupling the first and second parts of the chamber;

an interface housing mounted to the first end of the cylinder;

a sealing scraper assembly, mounted at the first end of the cylinder by the interface housing, comprising:

a sealing ice scraper sleeve having a generally cylindrical scraper surface, said scraper surface defining a scraper surface bore through which said shaft reciprocally passes;

said scraper surface bore being sized larger than said shaft so to define a desired gap between the scraper surface and the shaft;

a recess formed into said scraper surface; and an outer fluid seal mounted within said recess and in fluid sealing contact with the shaft, whereby liquid within said gap is at least inhibited from passing the outer fluid seal and into said damping fluid chamber;

said interface housing comprising a first axial-position mounting element and a second, resilient, axial-position mounting element, said scraper sleeve captured between said mounting elements, whereby said scraper sleeve may move axially against the second mounting element;

the second, resilient, axial-position mounting element also acting as an inner fluid seal in sealing contact with the shaft; and said second mounting element comprising a generally conical sealing portion which resiliently engages both said shaft and said scraper sleeve.

19. A shock absorber comprising:

a damping fluid cylinder having a first end and defining a damping fluid chamber;

a piston assembly comprising;

a shaft having a first shaft end within the cylinder; and a piston mounted to the shaft towards the first shaft end for reciprocal movement within the cylinder, the piston dividing the chamber into first and second variable-volume parts;

at least one of the piston assembly and the cylinder comprising a restricted fluid flow path fluidly coupling the first and second parts of the chamber;

an interface housing mounted to the first end of the cylinder;

a sealing scraper assembly, mounted at the first end of the cylinder by the interface housing, comprising:

a sealing ice scraper member having a generally cylindrical scraper surface, said scraper surface defining a scraper surface bore through which said shaft reciprocally passes;

said scraper surface bore being sized larger than said shaft so to define a desired gap between the scraper surface and the shaft;

a recess formed into said scraper surface; and a fluid seal mounted within said recess and in fluid sealing contact with the shaft, whereby liquid within said gap is at least inhibited from passing the fluid seal and into said damping fluid chamber; and said interface housing comprising means for permitting limited axial and radial movement of said scraper member relative to the cylinder.

* * * * *